(12) United States Patent
Wei et al.

(10) Patent No.: US 12,210,981 B2
(45) Date of Patent: Jan. 28, 2025

(54) AUTO FEATURE PREPARATION FOR HIGH PERFORMANCE ONLINE INFERENCING

(71) Applicant: International Business Machines Corporation, Armonk, NY (US)

(72) Inventors: Ke Wei Wei, Beijing (CN); Hong Min, Hopewell Junction, NY (US); Shuang Ys Yu, Beijing (CN); Qi Zhang, West Harrison, NY (US); Meichi Maggie Lin, San Jose, CA (US); Peter Bendel, Holzgerlingen (DE); Heng Liu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 974 days.

(21) Appl. No.: 17/218,724

(22) Filed: Mar. 31, 2021

(65) Prior Publication Data
US 2022/0318652 A1  Oct. 6, 2022

(51) Int. Cl.
| | |
|---|---|
| G06N 5/04 | (2023.01) |
| G06F 16/23 | (2019.01) |
| G06F 16/2453 | (2019.01) |
| G06F 18/21 | (2023.01) |
| G06N 20/00 | (2019.01) |

(52) U.S. Cl.
CPC ........... *G06N 5/04* (2013.01); *G06F 16/2308* (2019.01); *G06F 16/24549* (2019.01); *G06F 18/217* (2023.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,880,344 | B2 * | 1/2024 | He | G06F 16/258 |
| 2015/0379072 | A1 * | 12/2015 | Dirac | G06N 20/00 707/693 |
| 2015/0379423 | A1 * | 12/2015 | Dirac | G06N 20/00 706/12 |
| 2018/0240062 | A1 * | 8/2018 | Crabtree | G06Q 20/0855 |
| 2019/0228261 | A1 | 7/2019 | Chan | |
| 2019/0278247 | A1 | 9/2019 | Abe | |
| 2019/0333155 | A1 * | 10/2019 | Natesan Ramamurthy | G06N 20/00 |

(Continued)

OTHER PUBLICATIONS

Rajah, "Data Fast and Slow—Marriage of Batch and Real time," Apr. 20, 2017, https://www.linkedin.com/pulse/data-fast-slow-marriage-batch-real-time-chandan-rajah.*

*Primary Examiner* — Ryan Barrett
(74) *Attorney, Agent, or Firm* — Steven M. Bouknight

(57) ABSTRACT

An approach is provided in which a method, system, and program product analyze, while training a machine learning model, a set of first data transformation operators in a first data preparation pipeline that generates a plurality of constructed features from a set of training data. The method, system, and program product create a plurality of second data preparation pipelines from the first data preparation pipeline, wherein the set of first data transformation operators are converted to a set of second data transformation operators and each assigned to one of the plurality of second data preparation pipelines. The method, system, and program product deploy the plurality of second data preparation pipelines to a runtime system.

17 Claims, 9 Drawing Sheets

(56) References Cited

U.S. PATENT DOCUMENTS

| | | |
|---|---|---|
| 2020/0210390 A1 | 7/2020 | Huang |
| 2020/0272947 A1 | 8/2020 | Carullo |
| 2021/0097444 A1* | 4/2021 | Bansal .................. G06F 9/5066 |
| 2021/0303585 A1* | 9/2021 | Fan ......................... G06F 16/27 |
| 2021/0365475 A1* | 11/2021 | Shreedharan ......... G06F 16/213 |
| 2022/0261598 A1* | 8/2022 | Chen ........................ G06N 3/08 |
| 2022/0318656 A1* | 10/2022 | Liu ........................ G06N 5/043 |

* cited by examiner

AUTO FEATURE PREPARATION FOR HIGH PERFORMANCE ONLINE INFERENCING

BACKGROUND

Businesses today perform real-time predictive analysis as part of mission critical applications and expect high performance. Predictive analysis typically uses a machine learning model to generate predictions. The machine learning model includes two main components to generate predictions, which are an inferencing pipeline and a scoring engine. The inferencing pipeline evaluates a set of conditions and outputs a set of inferences, and the scoring engine scores the set of inferences.

The overall performance of a predictive analysis system is not only the performance of the machine learning model prediction components, but the speed of transforming the data to a state that the machine learning model can evaluate, referred to as "data transformation" or "data preparation." For example, the predictive analysis system may need to perform several SQL operations on the data before the data is ready for the machine learning model inferencing pipeline (e.g., constructed features preparation). In fact, the data transformation usually requires more time than the machine learning model evaluation of the data.

Although the data transformation stage usually takes more time than the machine learning model evaluation, existing solutions focus on optimizing the machine learning model prediction components instead of optimizing the constructed features data preparation. Some solutions build their feature cache for performance but these solutions are designed for specific applications and cannot be used by general solutions. Other solutions rely on an ETL (Extract, Transform, and Load) process for data preparation and, as a result, are not able to use machine learning models in scenarios with low latency demand.

One approach that application developers use to address the data transformation performance concerns is to spend an extensive amount of effort to custom design and implement new applications to make the data transformation an offline process and cache the results for high performance inferencing. However, this approach leads to high development costs and is becoming one of the main prohibitors of machine learning project implementations.

BRIEF SUMMARY

According to one embodiment of the present disclosure, an approach is provided in which a method, system, and program product analyze, while training a machine learning model, a set of first data transformation operators in a first data preparation pipeline that generates a plurality of constructed features from a set of training data. The method, system, and program product create a plurality of second data preparation pipelines from the first data preparation pipeline, wherein the set of first data transformation operators are converted to a set of second data transformation operators and each assigned to one of the plurality of second data preparation pipelines. The method, system, and program product deploy the plurality of second data preparation pipelines to a runtime system.

According to another embodiment of the present disclosure, an approach is provided in which a method, system, and program product include a batch pipeline, a streaming pipeline, and an online pipeline. The batch pipeline invokes a subset of the set of second data transformation operators on a set of runtime data at one or more data refresh rates.

According to another embodiment of the present disclosure, an approach is provided in which a method, system, and program product generate by the batch pipeline, a customer set of constructed features using a set of runtime data. The batch pipeline generates the customer set of constructed features at one of the one or more data refresh rates. The method, system, and program product generate, by an inference pipeline at the runtime system, one or more inferences utilizing the customer set of constructed features.

According to another embodiment of the present disclosure, an approach is provided in which a method, system, and program product re-train the machine learning model using a first subset of the set of training data. The first subset of training data excludes a first portion of the set of training data that occurred during a first time series. The method, system, and program product identify one of the set of first data transformation operators that fails to reach a performance threshold during the first time machine learning model re-training. The method, system, and program product assign one of the set of refresh rates to the identified first data transformation operator that is less than the first time series. The method, system, and program product assign the identified first data transformation operator to the batch pipeline.

According to another embodiment of the present disclosure, an approach is provided in which a method, system, and program product identify one of the set of first data transformation operators that requires the set of runtime data that is real-time. The method, system, and program product assign the identified first data transformation operator to the streaming pipeline.

According to another embodiment of the present disclosure, an approach is provided in which a method, system, and program product identify one or more of the set of second data transformation operators performed by the batch pipeline that generate a same one or more of the customer set of constructed features. The method, system, and program product merge the identified one or more second data transformation operators.

According to another embodiment of the present disclosure, an approach is provided in which a method, system, and program product identify a set of first data transformation operators that comprise one or more hard-coded time series operators. The method, system, and program product convert the one or more hard-coded time series operators to one or more auto-matching time series operators. The method, system, and program product include the one or more auto-matching time series operators in the set of second data transformation operators.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
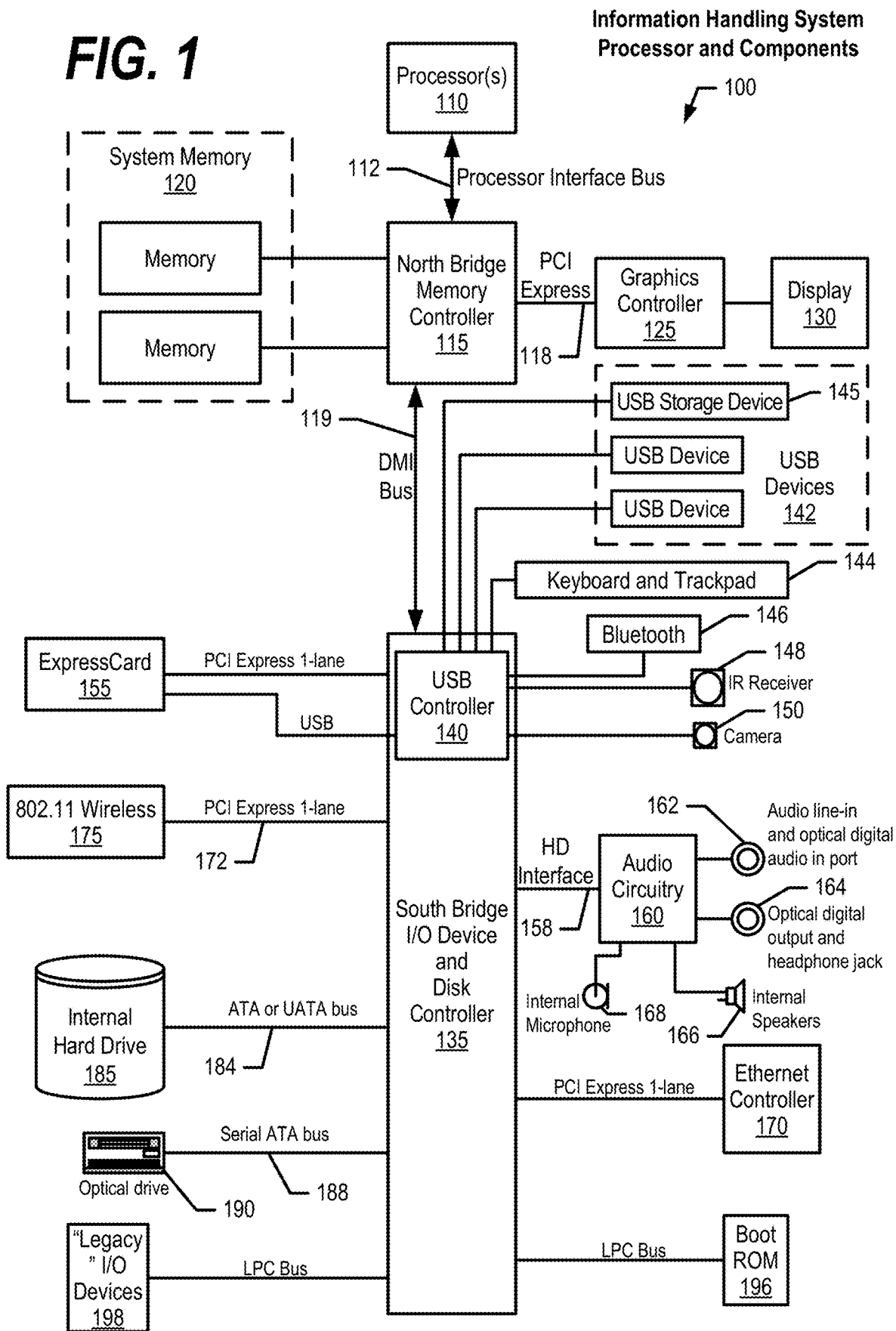
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
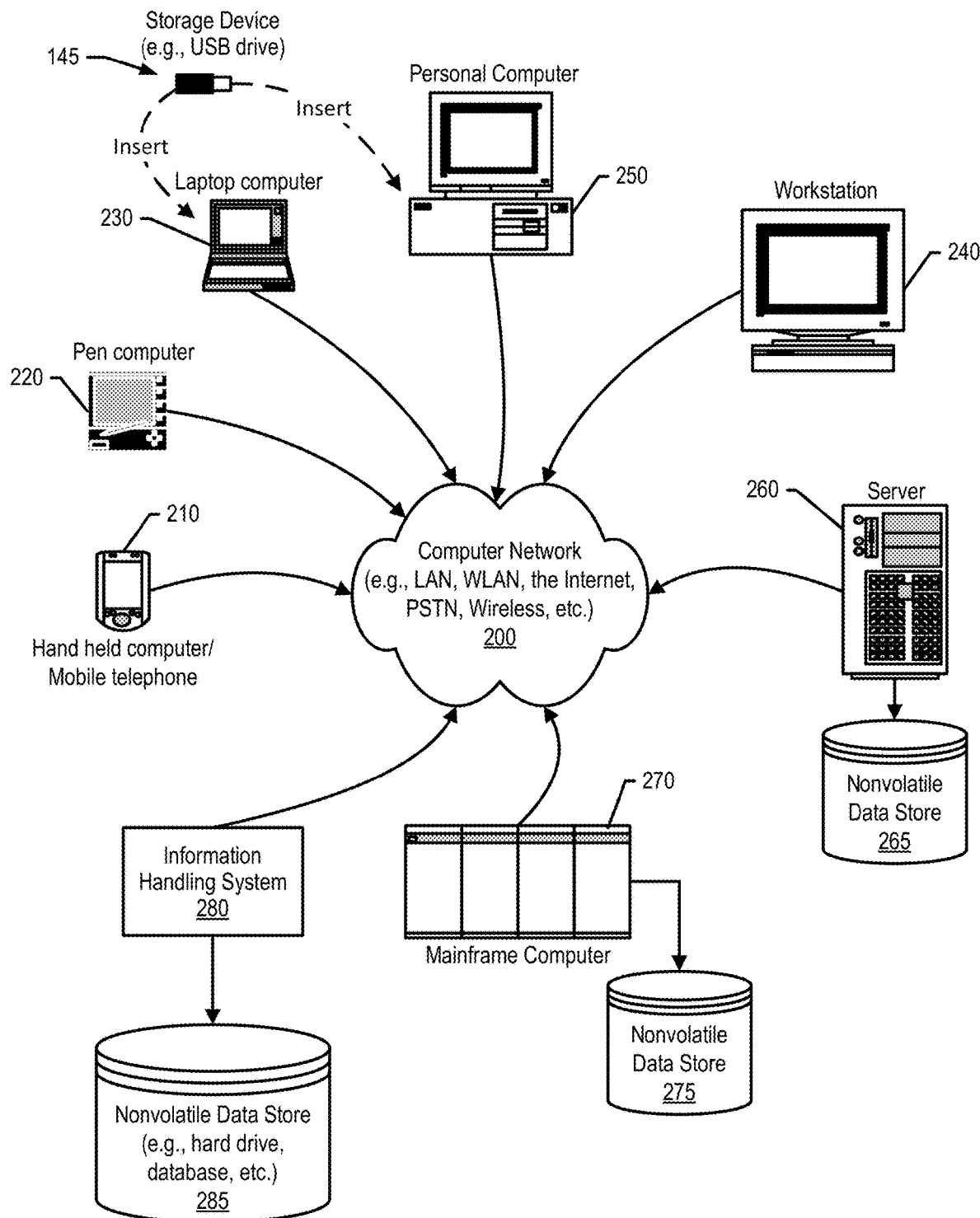
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, existing solutions focus on optimizing machine learning mode prediction components instead of optimizing constructed features preparation. Some solutions build their feature cache for performance but they are designed for specific applications and cannot be used by general solutions. Some customers rely on an ETL process for data preparation and therefore cannot use machine learning models in scenarios with low latency demand. For example, a card fraud detection model may require the following:

Average amount spent per transactions in the past 1/2/4 weeks;
Maximum amount spent per transactions in the past 1/2/4 weeks;
Average amount spent per day in the past 1/2/4 weeks;
Maximum amount spent per day in the past 1/2/4 weeks;
Total number of transactions with the same merchant; and
Number of retailer locations per day and the duration between these locations.

In the example above, some requirements require a multiple amount of aggregations to prepare the data for inferencing (e.g., a first aggregation using the past 1 week of data, a second aggregation using the past 2 weeks of data, etc.). As such, three aggregations are required to fulfill the average transaction amount requirement (1/2/4 weeks); three aggregations are required to fulfill the max transaction amount requirement (1/2/4 weeks); three aggregations are required to fulfill the average amount spent per day requirement (1/2/4 weeks); and three aggregations are required to fulfill the max amount spent per day query (1/2/4 weeks), for a total of 12 aggregations to fulfill the first four requirements. Then, one aggregation is required to fulfill the total number of transactions with the same merchant requirement, one aggregation is required to fulfill the number of retailer locations per day requirement, and one aggregation is required to fulfill the duration between retailer locations requirement, which adds up to 15 aggregations. As a result, in this example, the feature preparation time could be 15*8 ms per aggregation=120 ms feature preparation time compared against 5 ms for model inferencing time. In other words, the data preparation time could take tens/hundreds times longer than the modeling inferencing time.

FIGS. 3 through 9 depict an approach that can be executed on an information handling system that automatically identifies time consuming data transformation operators in a machine learning pipeline and generates scheduled jobs (batches) to prepare the data for machine learning model inferencing. The approach automatically generates optimized feature construction pipelines for deployment from the feature construction pipeline that is built during machine learning model training. The deployed package then selects the most cost-effective approach to process runtime data according to the runtime data features' construction complexity and latency requirements. As discussed herein, feature construction is the application of a set of constructive operators to a set of existing features resulting in construction of new features.

Figure 3:
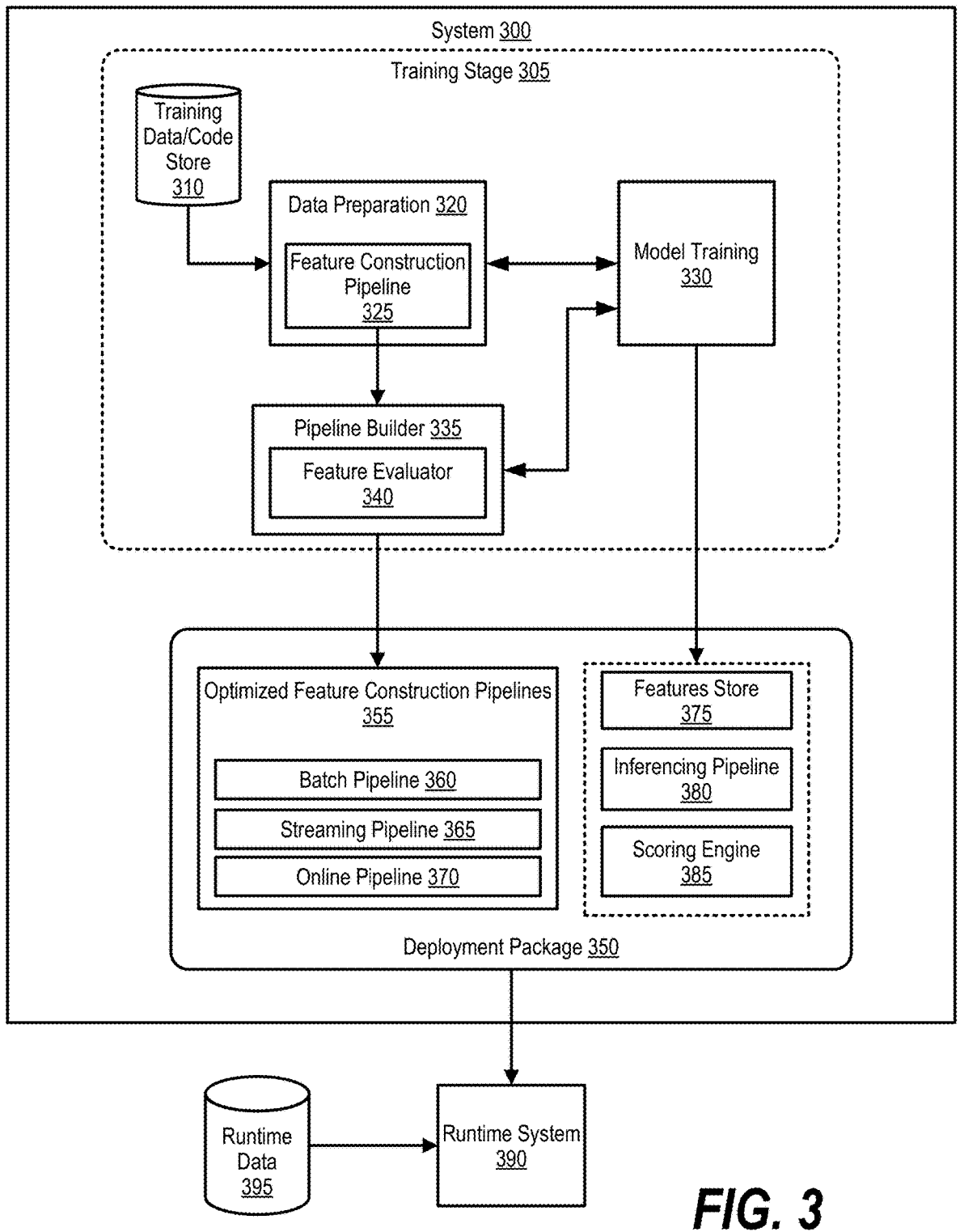
FIG. 3 is an exemplary diagram depicting a model generation system that trains a machine learning model and creates a deployment package that includes optimized feature construction pipelines and machine learning model components based on the machine learning model training.

FIG. 3 is an exemplary diagram depicting a model generation system that trains a machine learning model and creates a deployment package that includes optimized feature construction pipelines and machine learning model components based on the machine learning model training. System 300 trains a machine learning model via training stage 305. During training stage 305, data preparation 320 retrieves training data from training data/code store 310 and works in conjunction with model training 330 and pipeline builder 335 to iteratively train a machine learning model for predictive analysis. Data preparation 320 includes feature construction pipeline 325 that data preparation 320 adjusts during the machine learning model stage.

Pipeline builder 335 includes feature evaluator 340 that evaluates the "cost" (e.g., time) of feature preparation and the importance of feature latency to the machine learning model. To evaluate the cost, feature evaluator 340 samples the training data and probes the samples to estimate preparation cost of each of the features. Feature evaluator 340 adjusts a time series window (N) to understand the latency impact of the various features. In one embodiment, as feature evaluator 340 increases N, feature evaluator 340 identifies the refresh rate requirements of the various data transformation operators (DTOs) discussed below (see FIGS. 5, 6, and corresponding text for further details).

Once model training 330 completes, pipeline builder 335 analyzes the data transformation operators in the feature construction pipeline 325 and converts hard-coded time series data transformation operators to operators fitting the need of deployment with auto-matching of time series columns. For example, an operator may use a query "SELECT CARD_ID, AVG(AMOUNT) WHERE TRANS_DATE BETWEEN '2020-06-01' AND '2020-06-07' FROM CARD TRANS GROUP BY CARD_ID" to compute the average amount spent per transaction in the last week as a feature in feature construction pipeline 325. '2020-06-01' and '2020-06-07' are hard coded by data scientists because they work on a training dataset extracted from historical data and, as such, pipeline builder 335 needs to convert the operator to use a query "SELECT CARD_ID, AVG(AMOUNT) WHERE TRANS_DATE BETWEEN CURRENT DATE— 1 WEEK AND CURRENT DATE FROM CARD TRANS GROUP BY CARD_ID" to extract from current data. In this example, TRNAS_DATE is the time series column. Pipeline builder 335 detects any hard-coded date on time series columns in operators, correlates these dates to those in records to be scored, and then converts the operators to auto-matching time series operators accordingly.

Pipeline builder 335 creates optimized feature construction pipelines 335 from feature construction pipeline 325. Optimized feature construction pipelines 355 include batch pipeline 360 streaming pipeline 365 and online pipeline 370. As discussed herein, batch pipeline 360 prepares features that can be prepared through infrequent batch processes (e.g., daily); streaming pipeline 365 prepares features that must be prepared with near-real time data (e.g., prior transaction's location); and online pipeline 370 prepares features that can be quickly computed (e.g., customer input, see FIG. 7 and corresponding text for further details).

System 300 also inserts key components of the trained machine learning model into deployment package 350. This includes features store 375, inferencing pipeline 380, and scoring engine 385. Features store 375 stores the features that are constructed during the training stage. Inferencing pipeline 380 is the trained pipeline for predictive analysis. And, scoring engine 385 is the trained scoring engine to score the results from inferencing pipeline 380.

Figure 4:
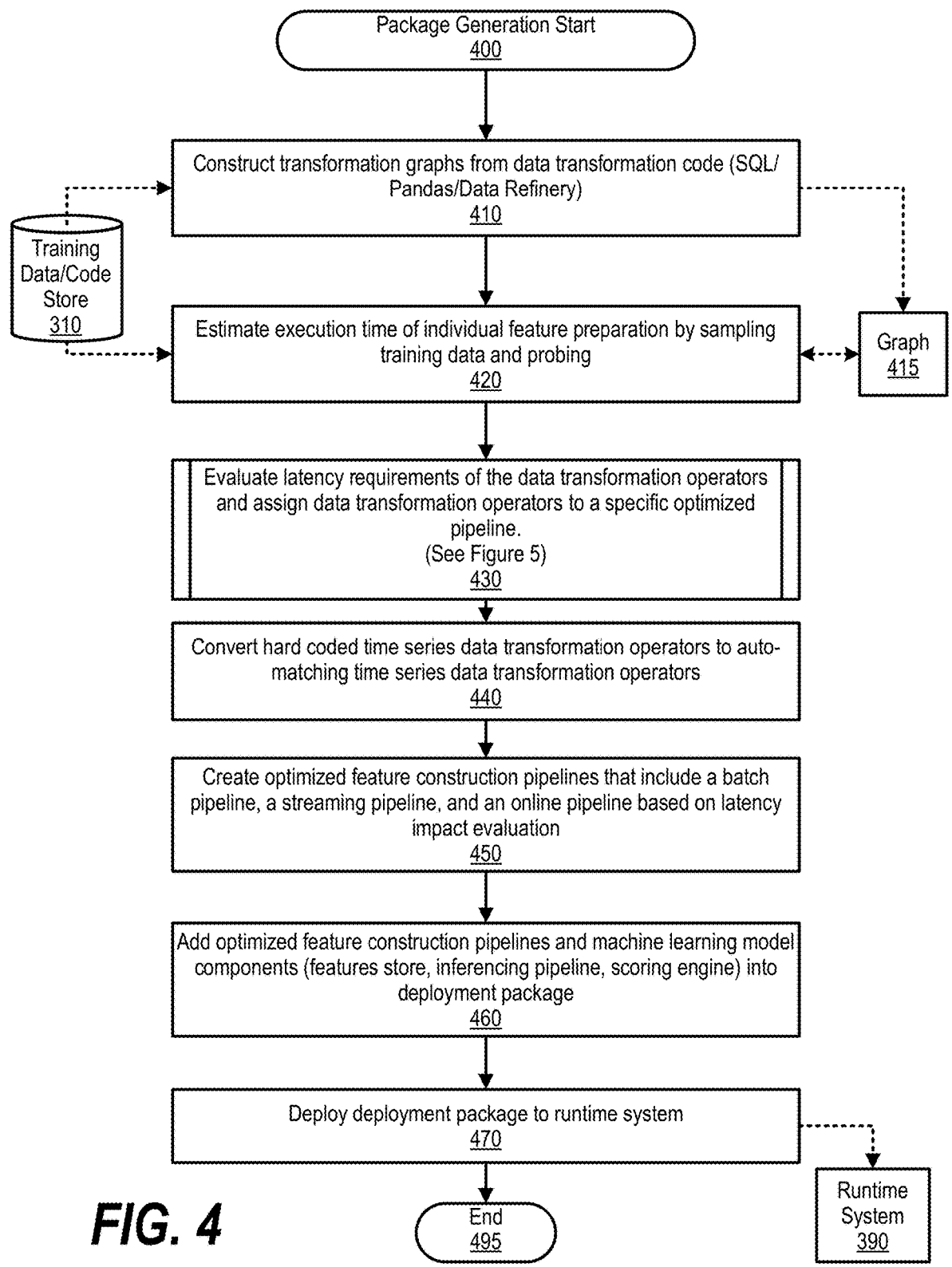
FIG. 4 is an exemplary flowchart showing steps taken to generate a deployment package to send to a runtime system.
Figure 6:
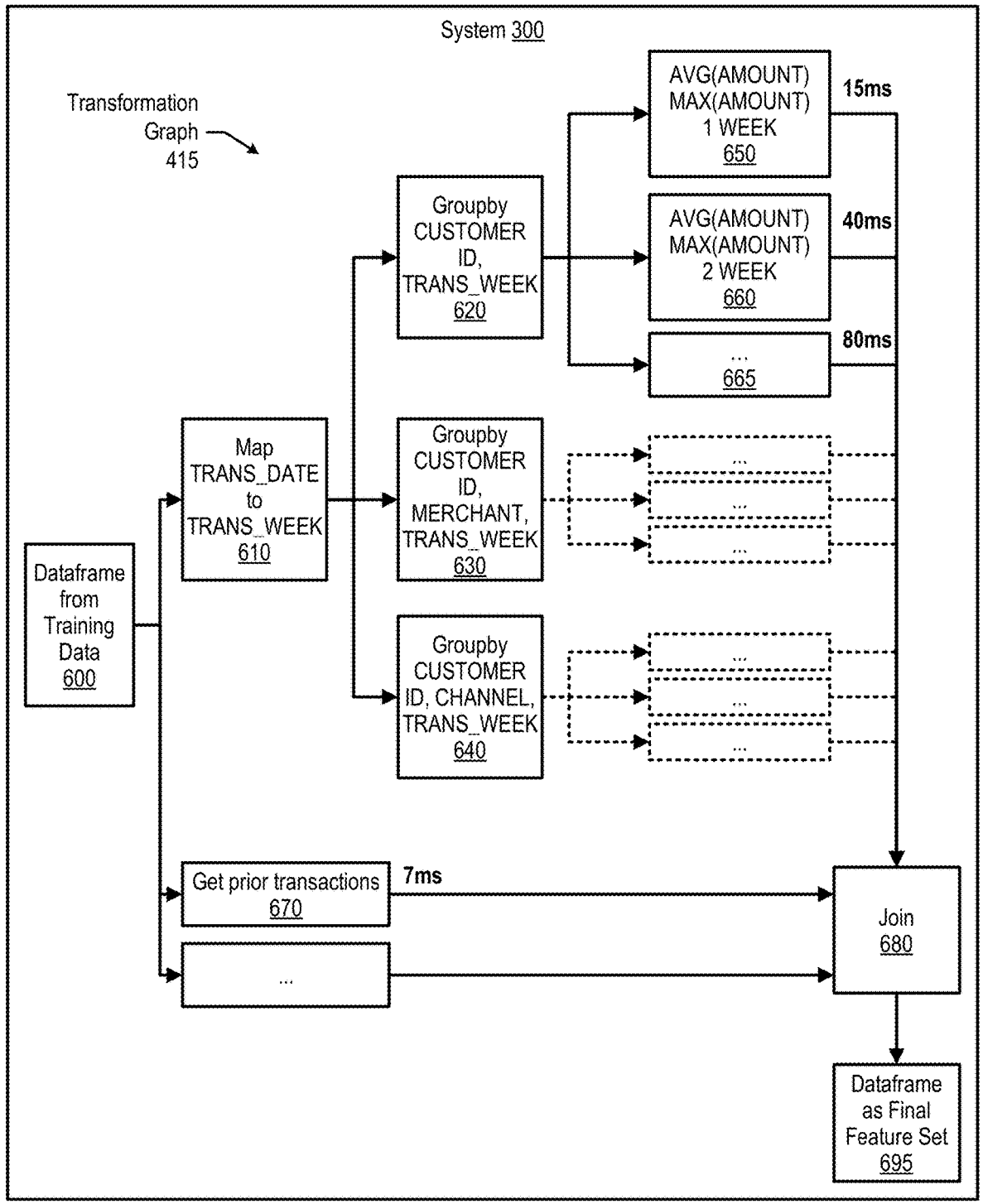
FIG. 6 is an exemplary diagram of a transformation graph based on feature preparation executions.

FIG. 4 is an exemplary flowchart showing steps taken to generate a deployment package to send to a runtime system. FIG. 4 processing commences at 400 whereupon, at step 410, the process constructs transformation graphs 415 from data transformation code (SQL/Pandas/Data Refinery) in training data/code store 310. Referring to FIG. 6, the process constructs transformation graph 415 from the training data code.

At step 420, the process estimates execution times of individual feature preparation by sampling training data 310 and probing the execution result times (see FIG. 6 and corresponding text for further details).

Figure 5:
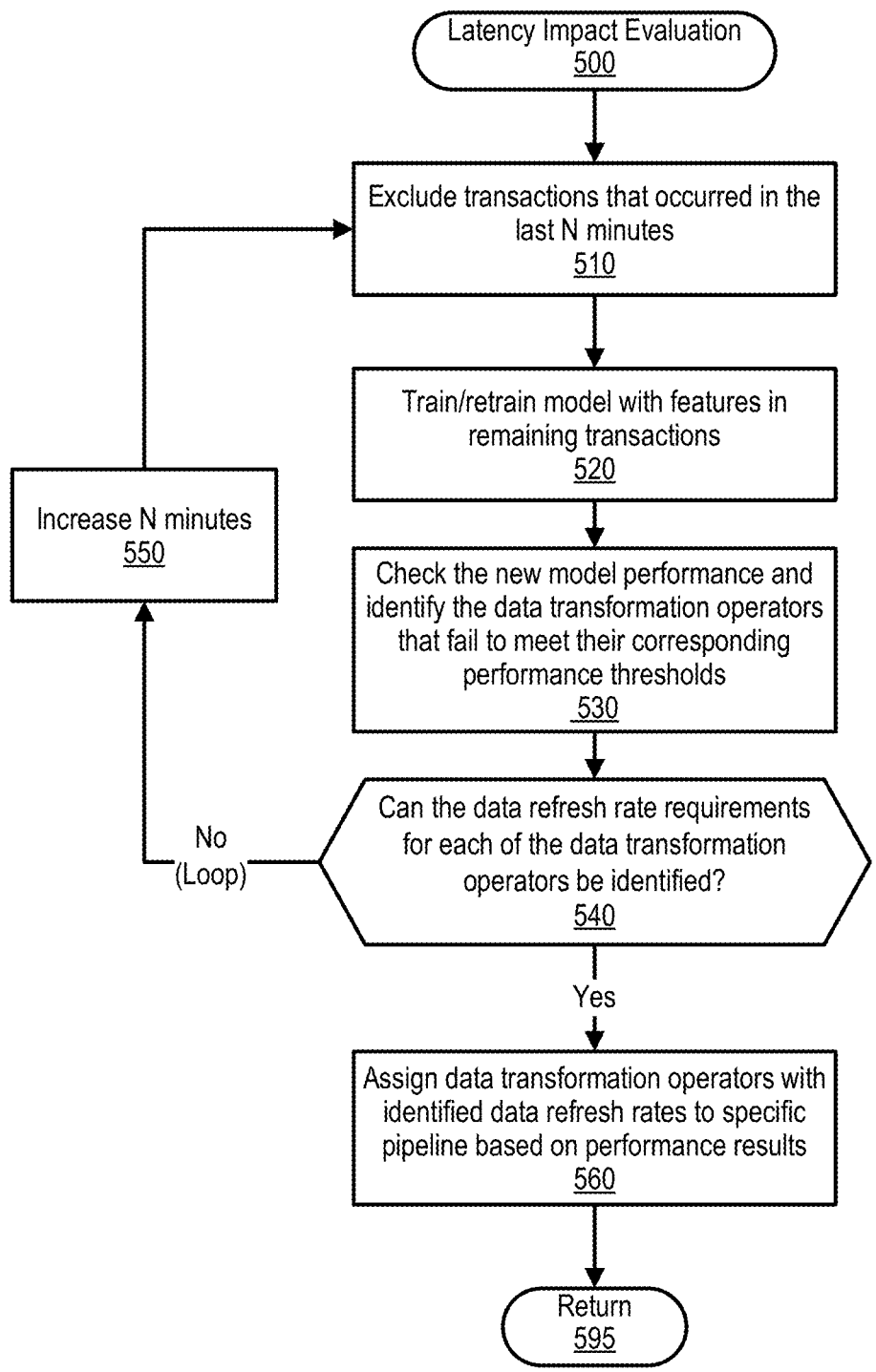
FIG. 5 is an exemplary flowchart showing steps taken to evaluate latency impacts of feature sets.

At predefined process 430, the process evaluates latency requirements of the data transformation operators and assigns data transformation operators to a specific optimized pipeline (see FIG. 5 and corresponding text for processing details). For example, the process may categorize the different batch cycles based on pre-defined threshold times.

At step 440, the process converts hard-coded time series data transformation operators to auto-matching time series data transformation operators. For example, as discussed above, when an operator uses a query "SELECT CARD_ID, AVG(AMOUNT) WHERE TRANS_DATE BETWEEN '2020-06-01' AND '2020-06-07' FROM CARD TRANS GROUP BY CARD_ID," where TRNAS_DATE is the time series column, pipeline builder 335 converts the query to "SELECT CARD_ID, AVG(AMOUNT) WHERE TRANS_DATE BETWEEN CURRENT DATE— 1 WEEK AND CURRENT DATE FROM CARD TRANS GROUP BY CARD_ID".

At step 450, the process creates optimized feature construction pipelines 355 that include batch pipeline 360, streaming pipeline 365, and online pipeline 370 based on the latency impact evaluation. At step 460, the process adds optimized feature construction pipelines 355 and machine learning model components (features store 375, inferencing pipeline 380, and scoring engine 385) into deployment package 350. At step 470, the process deploys deployment package 350 to runtime system 390 and FIG. 4 processing thereafter ends at 495.

FIG. 5 is an exemplary flowchart showing steps taken to evaluate latency impacts of feature sets. FIG. 5 processing commences at 500 whereupon, at step 510, the process excludes transactions that happened in the last N minutes. For example, a feature "the average amount spent per transaction in the last week" is constructed with the transaction data between '2020-06-01 00:00:00' and '2020-06-07 23:59:59.999'. After the process excludes transactions that happened in the last 5 minutes, the feature will use the transaction data between "2020-06-01 00:00:00' and '2020-06-07 23:54:59.999'.

At step 520, the process trains the machine learning model with features in the remaining transactions and, at step 530, the process checks the new model performance and identifies the data transformation operators that fail to meet their corresponding performance thresholds, such as by an F1 score or AUC (Area Under ROC Curve). An F-score is a measure of a test's accuracy and the F1 score is the harmonic mean of the test's precision and recall.

The process determines as to whether the data refresh rate requirements for each of the data transformation operators can be identified (decision 540). For example, if the process increases N and data transformation operator X causes a drop in performance, then the process knows that data transformation operator X requires up to date data and should be assigned to the streaming pipeline or online pipeline. Continuing with the examine, if data transformation operator Y still performs at N but falls off at N+5 minutes, the process knows that data transformation operator Y should have a refresh rate less than N+5 minutes (e.g., N+4 minutes). The process continues to increase N until the process identifies drop off points for each of the data transformation operators.

If the data refresh rate requirements for each of the data transformation operators cannot be identified, then decision 540 branches to the 'no' branch which loops back to increase the amount of N minutes (step 550) to exclude more transactions that happened in the last N minutes. This looping continues until the data refresh rate requirements for each of the data transformation operators can be identified, at which point decision 540 branches to the 'yes' branch exiting the loop.

At step 560, the process assigns the data transformation operators with their identified data refresh rates to specific pipelines based on the performance results. For example, if a data transformation operator does not require recent data to maintain sufficient performance, the data transformation operator is assigned to a batch pipeline. Conversely, if a data transformation operator requires up-to-date data, the data transformation operator is assigned to the streaming pipeline or the online pipeline. FIG. 5 processing thereafter returns to the calling routine (see FIG. 4) at 595.

FIG. 6 is an exemplary diagram of a transformation graph based on feature preparation executions. System 300 generates transformation graph 415 from training data executions that prepare the training data during training stage 305 (e.g., aggregations). Transformation graph 415 is a transformation "tree" with multiple nodes that each correspond to a particular feature preparation execution. Transformation graph 415 starts with node 600, which corresponds to the original training data in training data/code store 310. Node 610 branches into multiple nodes, such as node 610, node 670, and etc.

Node 610 branches to nodes 620 630 and 640, that each correspond to particular queries. For example node 620 corresponds to a query that retrieves customer ID and their corresponding transactions per week. Node 630 corresponds to a query that retrieves customer ID, merchant, and transactions per week. Node 640 corresponds to a query that retrieves customer ID, channel, and transactions per week.

Nodes 620, 630, and 640 further branch into other nodes. For example, node 620 branches to three more nodes 650, 660, and 665. Node 650 corresponds to the average amount of transactions and the maximum amount of transactions in one week. Node 660 corresponds to an average amount of transactions at a maximum of transactions in two weeks.

System 300 determines that node 650 takes 15 ms to execute based on sampling and probing; node 660 takes 40 ms to execute; node 665 takes 18 ms to execute; and node 670 takes 7 ms to execute. In turn, system 300 joins each of the nodes via join 680 to create a data frame as the final feature-set 695. Final feature-set 695 is then stored in features set 375.

Figure 7:
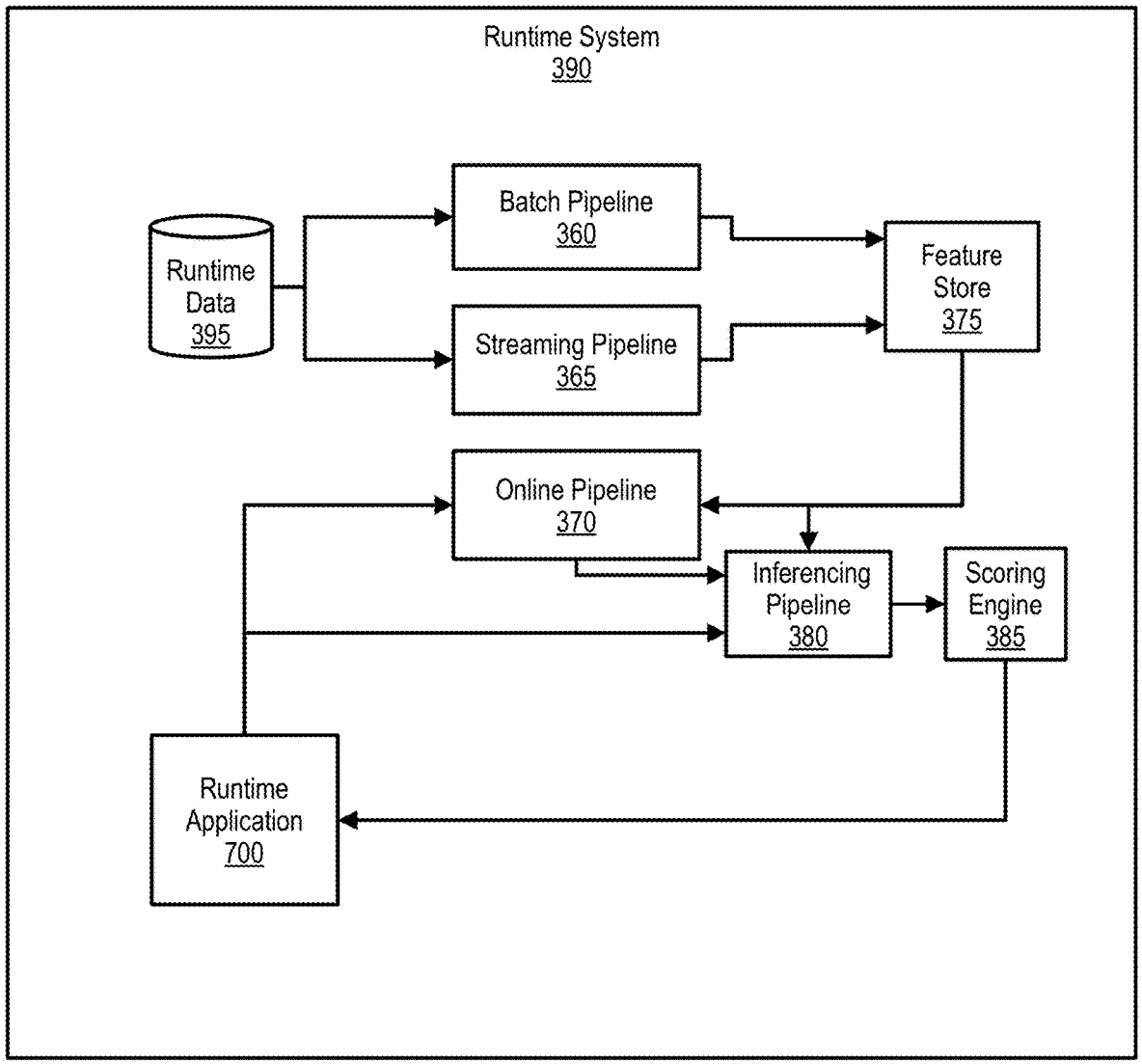
FIG. 7 is an exemplary diagram depicting a runtime system invoking a deployment package to perform predictive analysis with a runtime application using runtime data.

FIG. 7 is an exemplary diagram depicting a runtime system 390 invoking deployment package 350 to perform predictive analysis with runtime application 700 using runtime data 395.

Batch pipeline 360 and streaming pipeline 365 process runtime data 395 at predetermined intervals (N) such as once per week, once per day, once per hour, etc. The output of batch pipeline 360 and streaming pipeline 365 are stored in feature store 375 (see FIG. 8 and corresponding text for further details). Runtime application 700 uses the various optimized feature construction pipelines 355, along with inferencing pipeline 380 and scoring engine 385, to perform predictive analysis. As discussed herein, the overall amount of time to perform predictive analysis greatly decreases due to the fact that batch pipeline 360 and streaming pipeline 365 pre-prepare the constructed features requiring sufficient time such that the constructed features are ready for inferencing pipeline 380 when needed.

Figure 8:
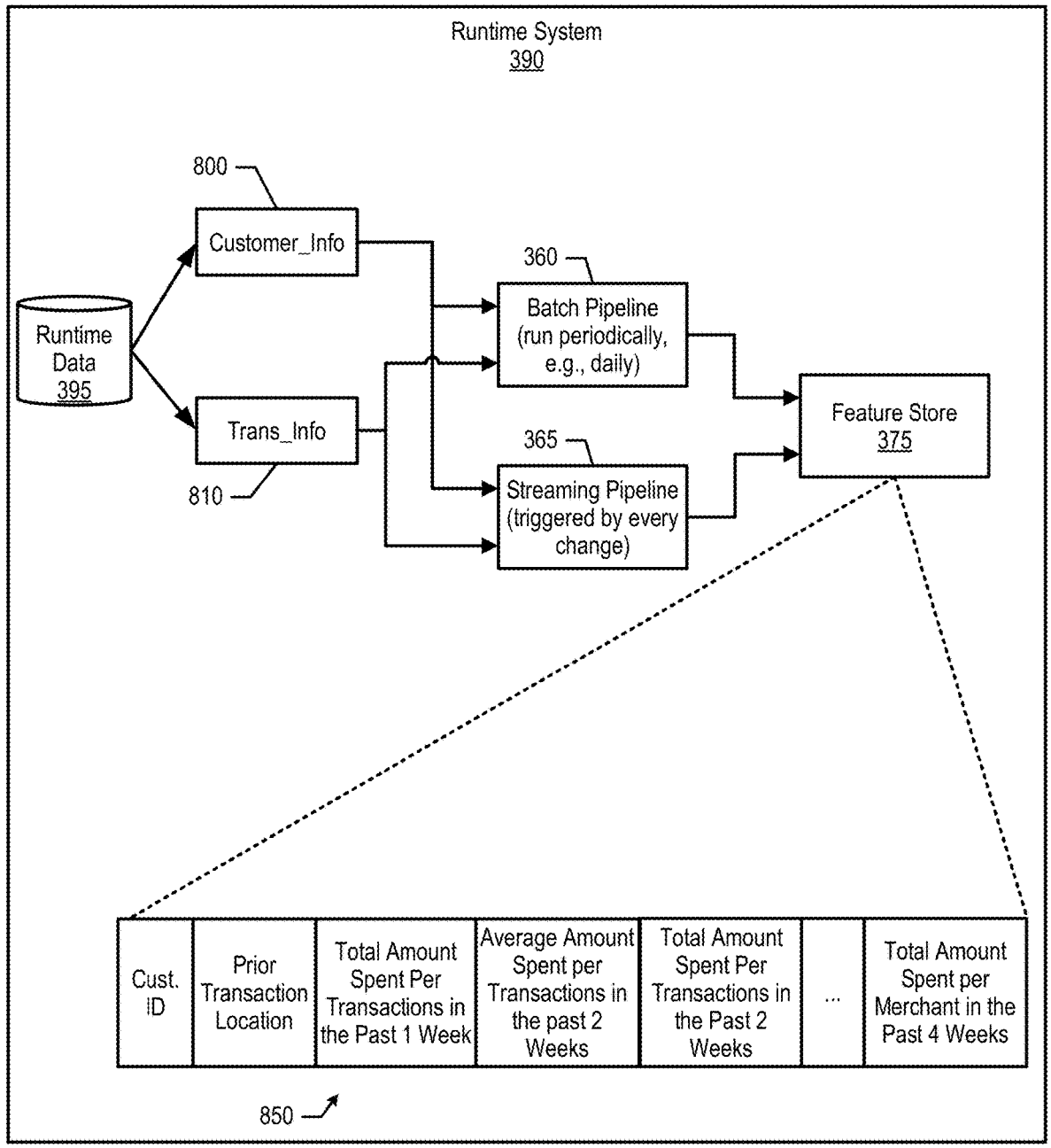
FIG. 8 is an exemplary diagram depicting a runtime system pre-processing runtime data using a batch pipeline and streaming pipeline.

FIG. 8 is an exemplary diagram depicting a runtime system 390 pre-processing runtime data using a batch pipeline 360 and streaming pipeline 365. Runtime data 395 includes customer info 800 and transaction info 810. Batch pipeline 360 and streaming pipeline 365 process the runtime data at predefined intervals. For example batch pipeline 360 may process the runtime data every day, every week, every hour, etc. based on runtime system 390's requirements.

Feature store 375 stores the results of batch pipeline 360 and streaming pipeline 365. Features 850 shows an example the constructed features that are ready for inferencing pipeline 380 to receive and process without delay.

Figure 9:
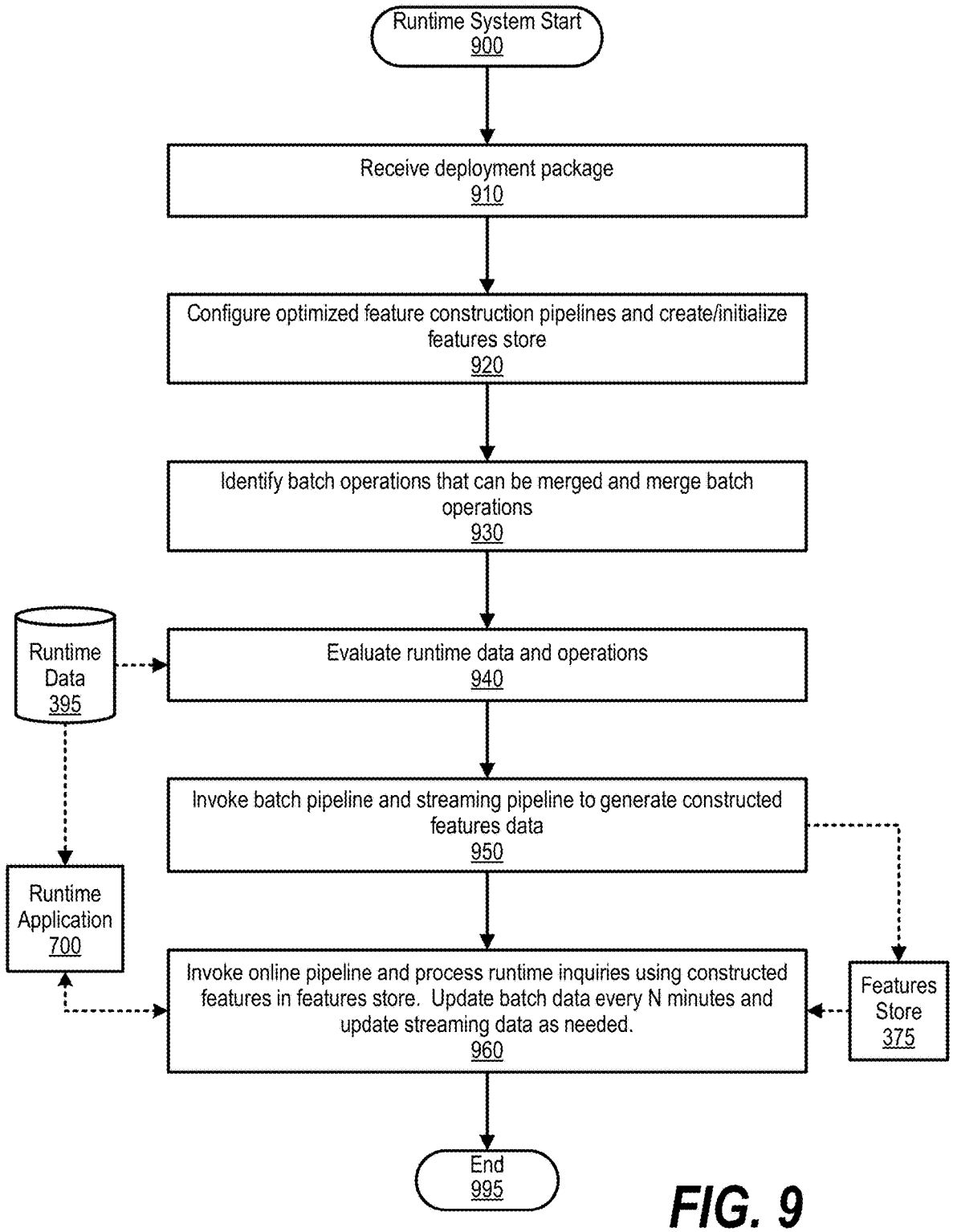
FIG. 9 is an exemplary flowchart showing steps taken by a runtime system to utilize a deployment package in a manner customized to the customer's data.

FIG. 9 is an exemplary flowchart showing steps taken by a runtime system to utilize deployment package 350 in a manner customized to the customer's data. FIG. 9 processing commences at 900 whereupon, at step 910, the process receives deployment package 910.

At step 920, the process configures optimized feature construction pipelines 350 and creates/initializes feature store 375 on runtime system 390. During configuration, the process determines where each pipeline should access data at inferencing time where i) online pipeline 370 prepares features that need to be quickly computed (e.g., customer input); ii) batch pipeline 360 prepares features that can be prepared through infrequent batch (e.g., daily); and iii) streaming pipeline 365 prepares features that require near real-time preparation (e.g., a prior transaction's location).

At step 930, the process identifies batch operations that can be merged and merges the batch operations accordingly. For example, an operator to compute the average amount per transactions in the last one week may be merged with the operator to compute the average amount per transactions in the last two weeks.

At step 940, the process evaluates runtime data and operations in runtime data 395 and, at step 950, the process invokes batch pipeline 360 and streaming pipeline 365 to generate constructed features data from runtime data 395. At step 960, the process invokes online pipeline 370 and processes customer inquiries using the constructed features in features store. The process updates the batch data every N minutes and updates the streaming data as needed. FIG. 9 processing thereafter ends at 995.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
training a machine learning model;
analyzing, while training the machine learning model, a set of first data transformation operators in a first data preparation pipeline that generates a plurality of constructed features from a set of training data;
creating a plurality of second data preparation pipelines from the first data preparation pipeline, wherein the set of first data transformation operators are converted to a set of second data transformation operators and each assigned to one of the plurality of second data preparation pipelines, and wherein the plurality of second data preparation pipelines comprise at least a batch pipeline, and wherein the batch pipeline invokes a subset of the set of second data transformation operators on a set of runtime data at one or more data refresh rates;

re-training the machine learning model using a first subset of the set of training data, wherein the first subset of training data excludes a first portion of the set of training data that occurred during a first time series;

identifying one of the set of first data transformation operators that fails to reach a performance threshold during the first time machine learning model re-training;

assigning one of the set of refresh rates to the identified first data transformation operator that is less than the first time series;

assigning the identified first data transformation operator to the batch pipeline; and deploying the plurality of second data preparation pipelines to a runtime system.

2. The computer-implemented method of claim 1 wherein the plurality of second data preparation pipelines further comprises a streaming pipeline and an online pipeline.

3. The computer-implemented method of claim 2 further comprising:
generating, by the batch pipeline, a customer set of constructed features using the set of runtime data, wherein the batch pipeline generates the customer set of constructed features at one of the one or more data refresh rates; and
generating, by an inference pipeline at the runtime system, one or more inferences utilizing the customer set of constructed features.

4. The computer-implemented method of claim 2 further comprising:
identifying one of the set of first data transformation operators that requires the set of runtime data that is real-time; and
assigning the identified first data transformation operator to the streaming pipeline.

5. The computer-implemented method of claim 2 further comprising:
identifying one or more of the set of second data transformation operators performed by the batch pipeline that generate a same one or more of the customer set of constructed features; and
merging the identified one or more second data transformation operators.

6. The computer-implemented method of claim 1 further comprising:
identifying a second set of first data transformation operators that comprise one or more hard-coded time series operators;
converting the one or more hard-coded time series operators to one or more auto-matching time series operators; and
including the one or more auto-matching time series operators in the set of second data transformation operators.

7. An information handling system comprising:
one or more processors;
a memory coupled to at least one of the processors;
a set of computer program instructions stored in the memory and executed by at least one of the processors in order to perform actions of:
training a machine learning model;
analyzing, while training the machine learning model, a set of first data transformation operators in a first data preparation pipeline that generates a plurality of constructed features from a set of training data;
creating a plurality of second data preparation pipelines from the first data preparation pipeline, wherein the set of first data transformation operators are converted to a set of second data transformation operators and each assigned to one of the plurality of second data preparation pipelines, and wherein the plurality of second data preparation pipelines comprise at least a batch pipeline, and wherein the batch pipeline invokes a subset of the set of second data transformation operators on a set of runtime data at one or more data refresh rates;
re-training the machine learning model using a first subset of the set of training data, wherein the first subset of training data excludes a first portion of the set of training data that occurred during a first time series;
identifying one of the set of first data transformation operators that fails to reach a performance threshold during the first time machine learning model re-training;
assigning one of the set of refresh rates to the identified first data transformation operator that is less than the first time series;
assigning the identified first data transformation operator to the batch pipeline; and
deploying the plurality of second data preparation pipelines to a runtime system.

8. The information handling system of claim 7 wherein the plurality of second data preparation pipelines further comprises a streaming pipeline and an online pipeline.

9. The information handling system of claim 8 wherein the processors perform additional actions comprising:
generating, by the batch pipeline, a customer set of constructed features using the set of runtime data, wherein the batch pipeline generates the customer set of constructed features at one of the one or more data refresh rates; and
generating, by an inference pipeline at the runtime system, one or more inferences utilizing the customer set of constructed features.

10. The information handling system of claim 8 wherein the processors perform additional actions comprising:
identifying one of the set of first data transformation operators that requires the set of runtime data that is real-time; and
assigning the identified first data transformation operator to the streaming pipeline.

11. The information handling system of claim 8 wherein the processors perform additional actions comprising:
identifying one or more of the set of second data transformation operators performed by the batch pipeline that generate a same one or more of the customer set of constructed features; and
merging the identified one or more second data transformation operators.

12. The information handling system of claim 8 wherein the processors perform additional actions comprising:
identifying a second set of first data transformation operators that comprise one or more hard-coded time series operators;
converting the one or more hard-coded time series operators to one or more auto-matching time series operators; and including the one or more auto-matching time series operators in the set of second data transformation operators.

13. A computer program product stored in a computer readable storage medium, comprising computer program code that, when executed by an information handling system, causes the information handling system to perform actions comprising:
   training a machine learning model;
   analyzing, while training the machine learning model, a set of first data transformation operators in a first data preparation pipeline that generates a plurality of constructed features from a set of training data;
   creating a plurality of second data preparation pipelines from the first data preparation pipeline, wherein the set of first data transformation operators are converted to a set of second data transformation operators and each assigned to one of the plurality of second data preparation pipelines, and wherein the plurality of second data preparation pipelines comprise at least a batch pipeline, and wherein the batch pipeline invokes a subset of the set of second data transformation operators on a set of runtime data at one or more data refresh rates;
   re-training the machine learning model using a first subset of the set of training data, wherein the first subset of training data excludes a first portion of the set of training data that occurred during a first time series;
   identifying one of the set of first data transformation operators that fails to reach a performance threshold during the first time machine learning model re-training;
   assigning one of the set of refresh rates to the identified first data transformation operator that is less than the first time series;
   assigning the identified first data transformation operator to the batch pipeline; and
   deploying the plurality of second data preparation pipelines to a runtime system.

14. The computer program product of claim 13 wherein the plurality of second data preparation pipelines further comprises a streaming pipeline and an online pipeline.

15. The computer program product of claim 14 wherein the information handling system performs further actions comprising:
   generating, by the batch pipeline, a customer set of constructed features using the set of runtime data, wherein the batch pipeline generates the customer set of constructed features at one of the one or more data refresh rates; and
   generating, by an inference pipeline at the runtime system, one or more inferences utilizing the customer set of constructed features.

16. The computer program product of claim 14 wherein the information handling system performs further actions comprising:
   identifying one of the set of first data transformation operators that requires the set of runtime data that is real-time; and
   assigning the identified first data transformation operator to the streaming pipeline.

17. The computer program product of claim 14 wherein the information handling system performs further actions comprising:
   identifying one or more of the set of second data transformation operators performed by the batch pipeline that generate a same one or more of the customer set of constructed features; and
   merging the identified one or more second data transformation operators.

* * * * *